Sept. 22, 1925. 1,554,765
A. H. SHAFFER
CONVEYER SYSTEM
Filed May 25, 1923 14 Sheets-Sheet 1

Witness
Herbert Buehler

Inventor
Alfred H. Shaffer
Clarence T. Poole
Attorney

Sept. 22, 1925.　　　　　A. H. SHAFFER　　　　　1,554,765
CONVEYER SYSTEM
Filed May 25, 1923　　　14 Sheets-Sheet 2
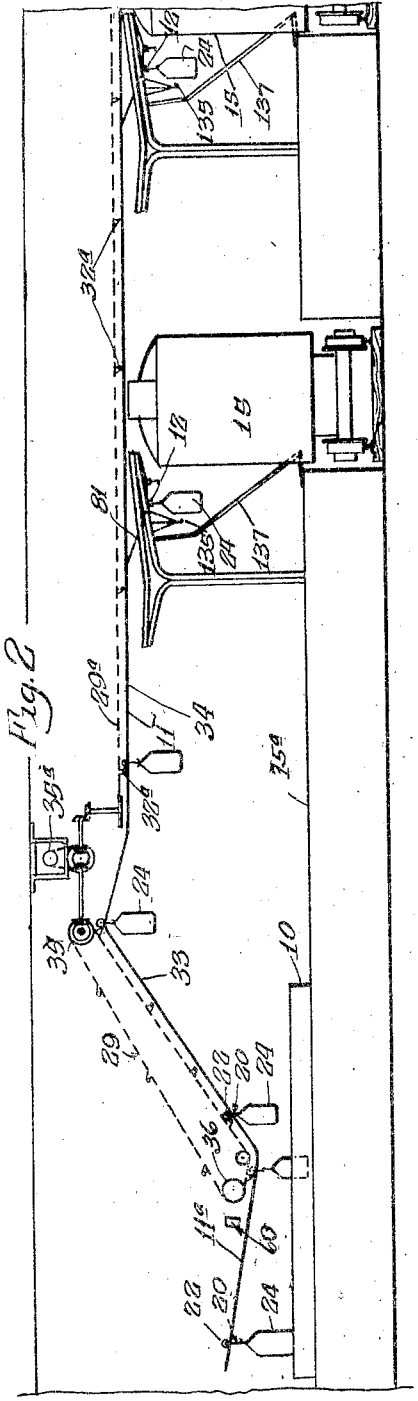
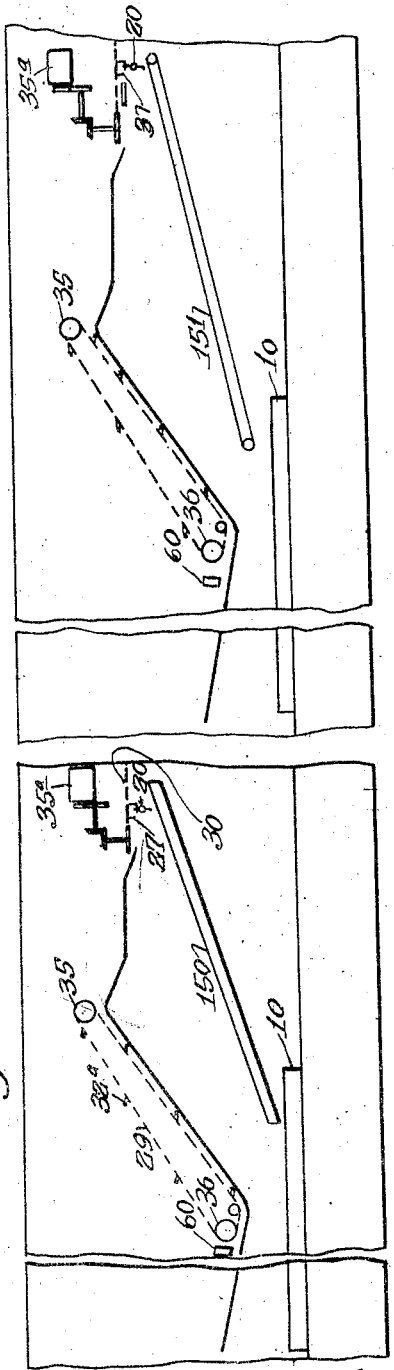
Witness
Herbert Buehler
Inventor
Alfred H. Shaffer
Clarence F. Poole
Attorney

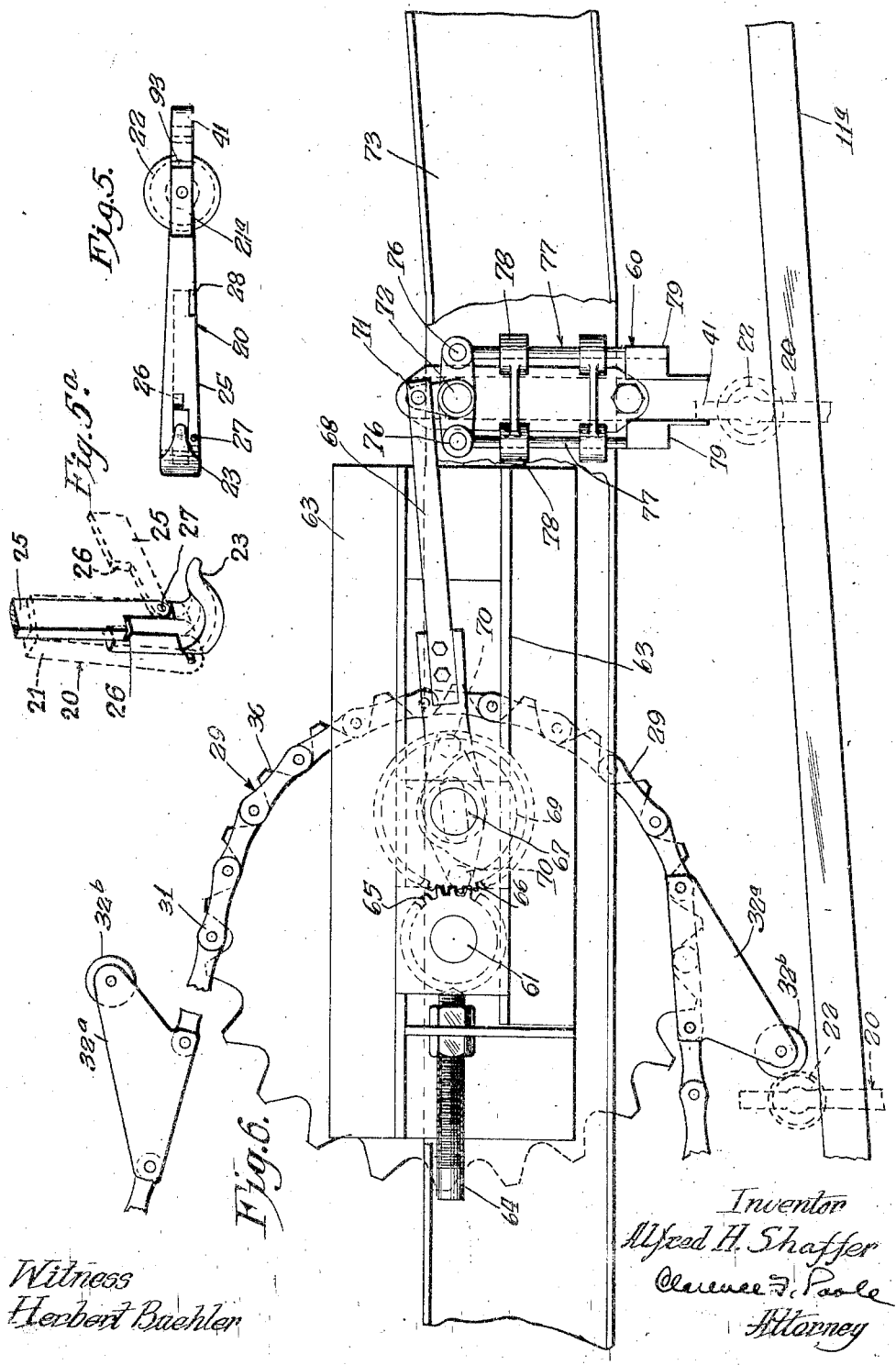

Sept. 22, 1925.                         1,554,765
              A. H. SHAFFER
              CONVEYER SYSTEM
          Filed May 25, 1923     14 Sheets-Sheet 4

Sept. 22, 1925.　　　　　　　　　1,554,765
A. H. SHAFFER
CONVEYER SYSTEM
Filed May 25, 1923　　14 Sheets-Sheet 5
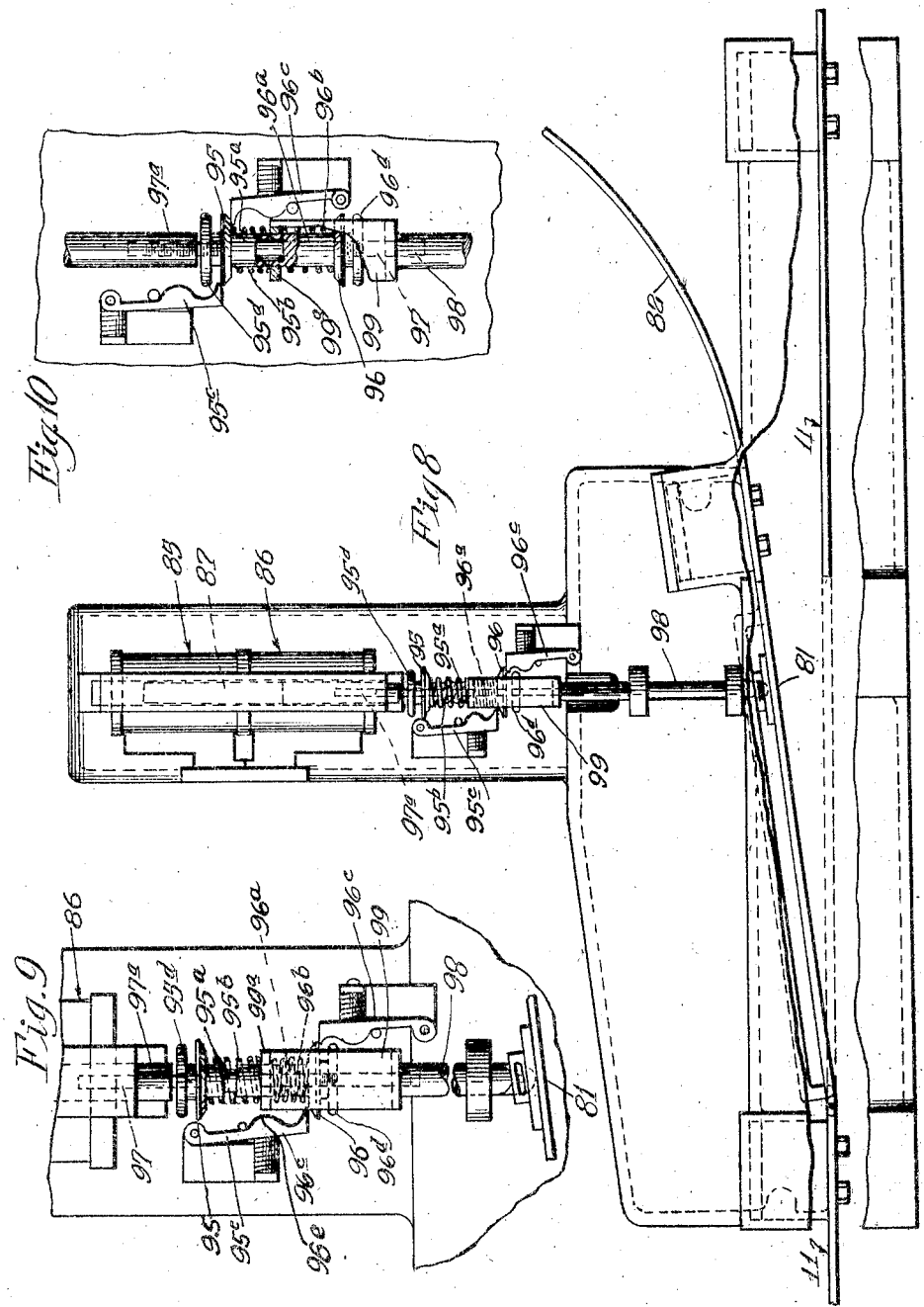

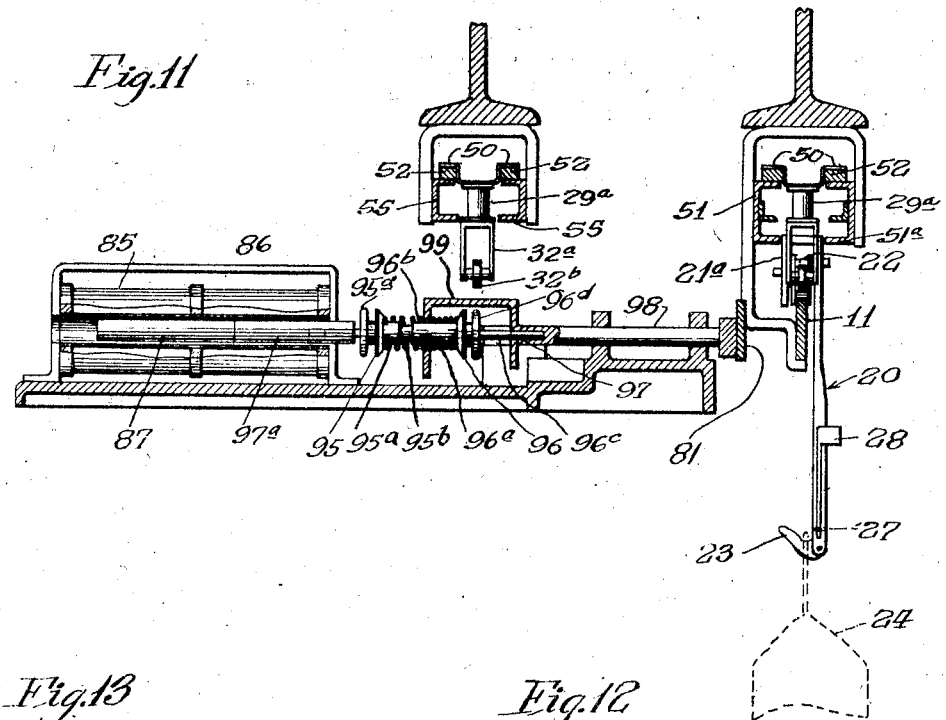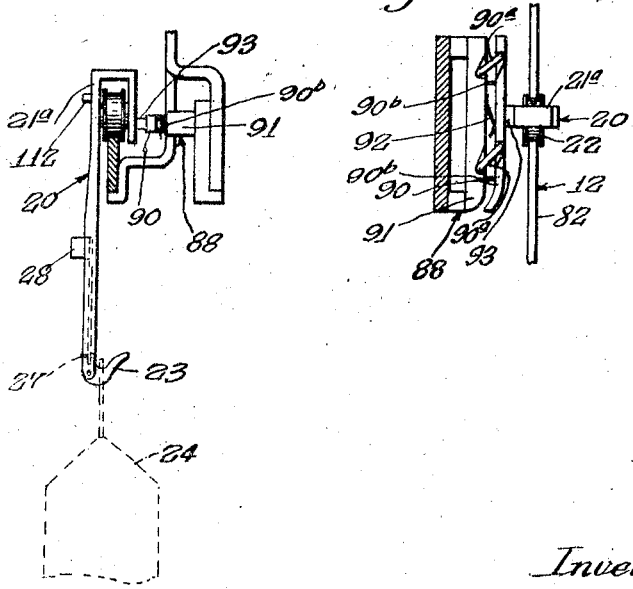

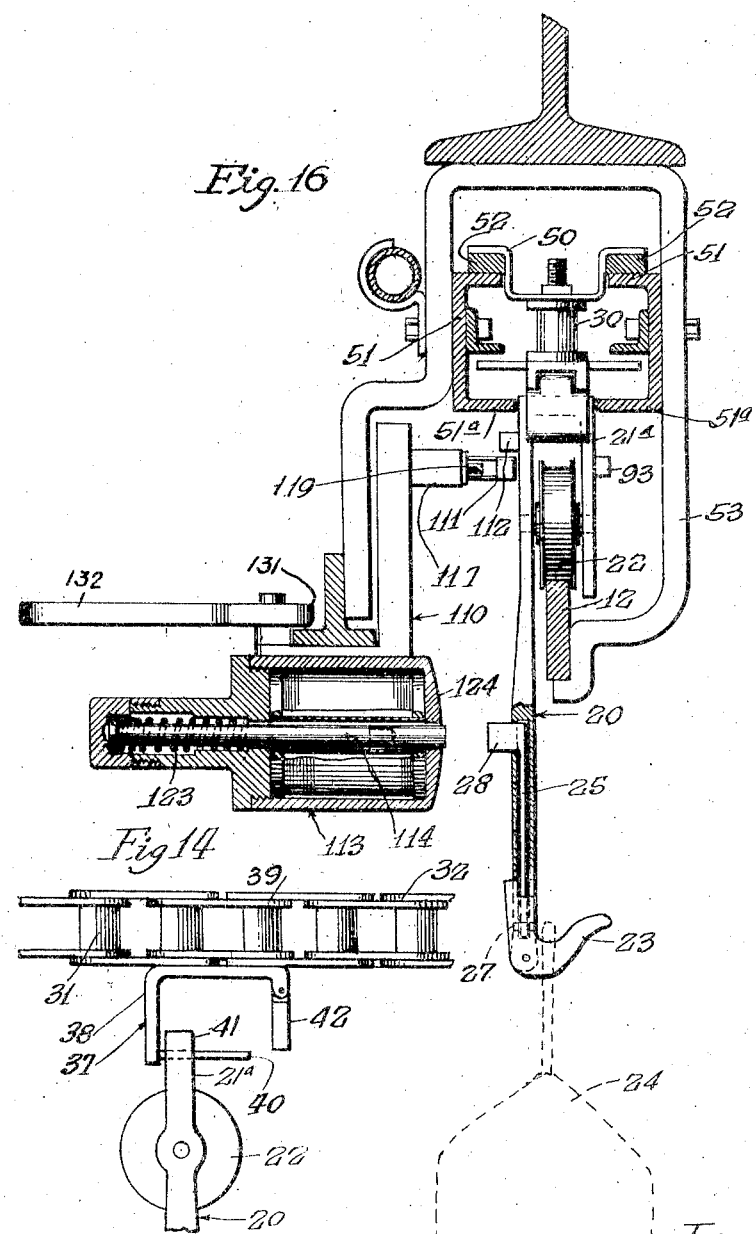

Sept. 22, 1925.
A. H. SHAFFER
1,554,765
CONVEYER SYSTEM
Filed May 25, 1923
14 Sheets-Sheet 8
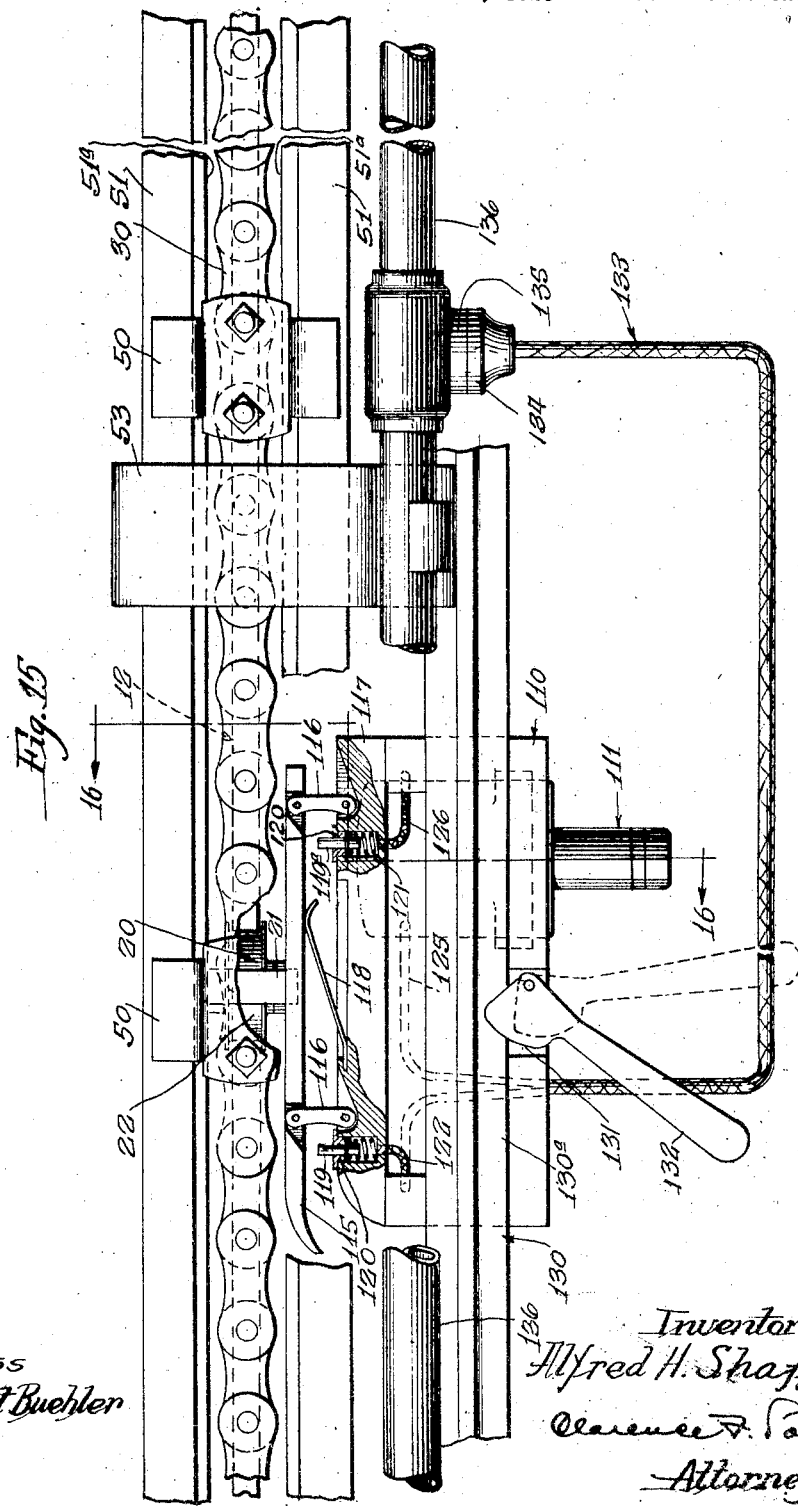

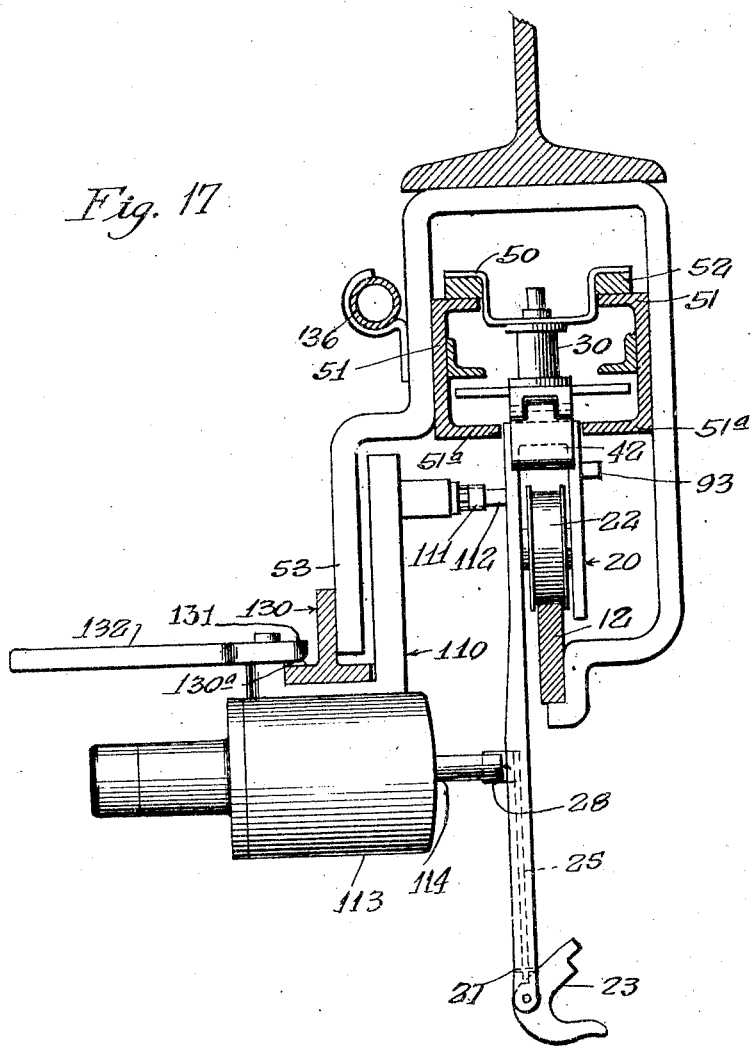

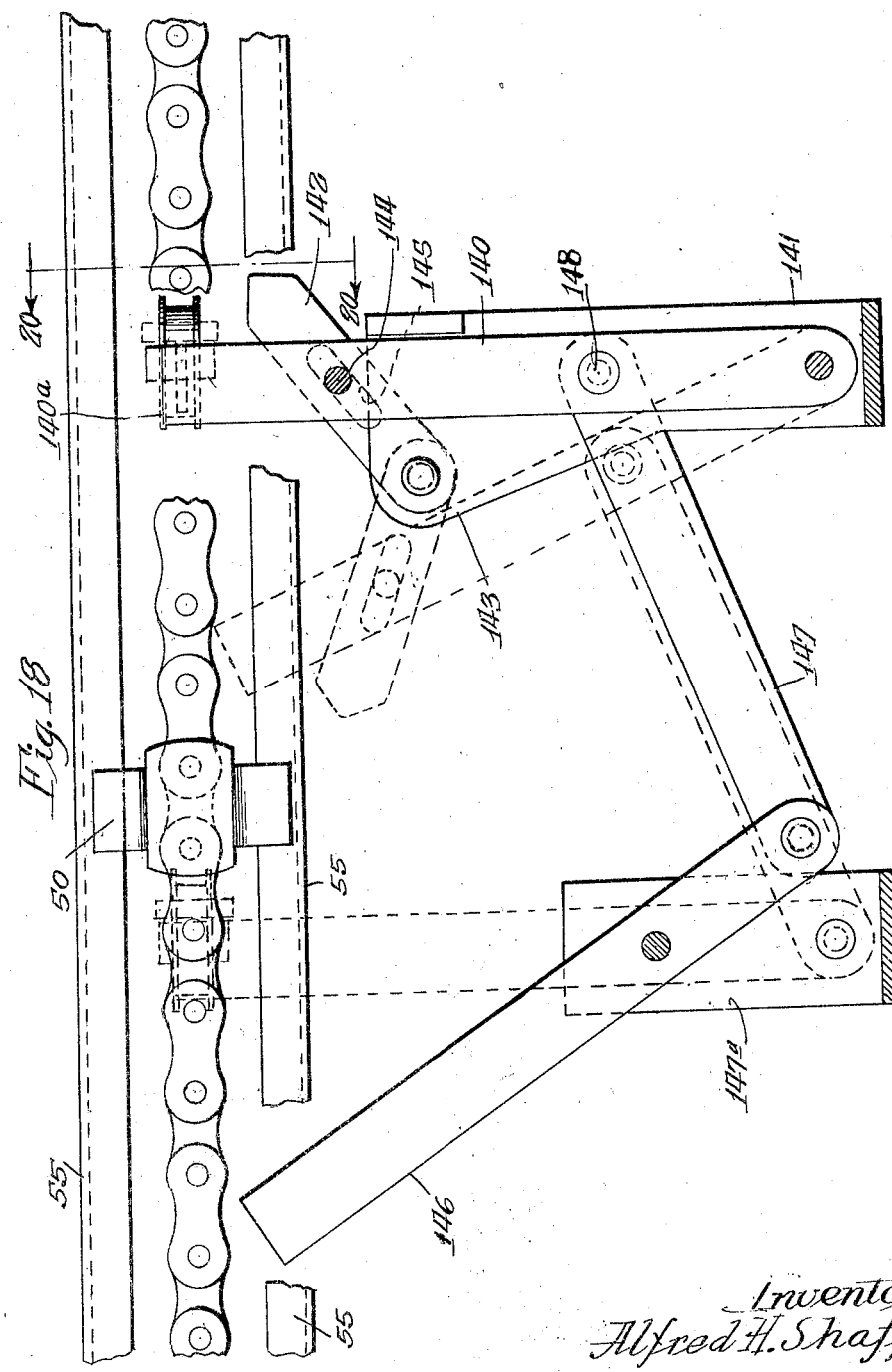

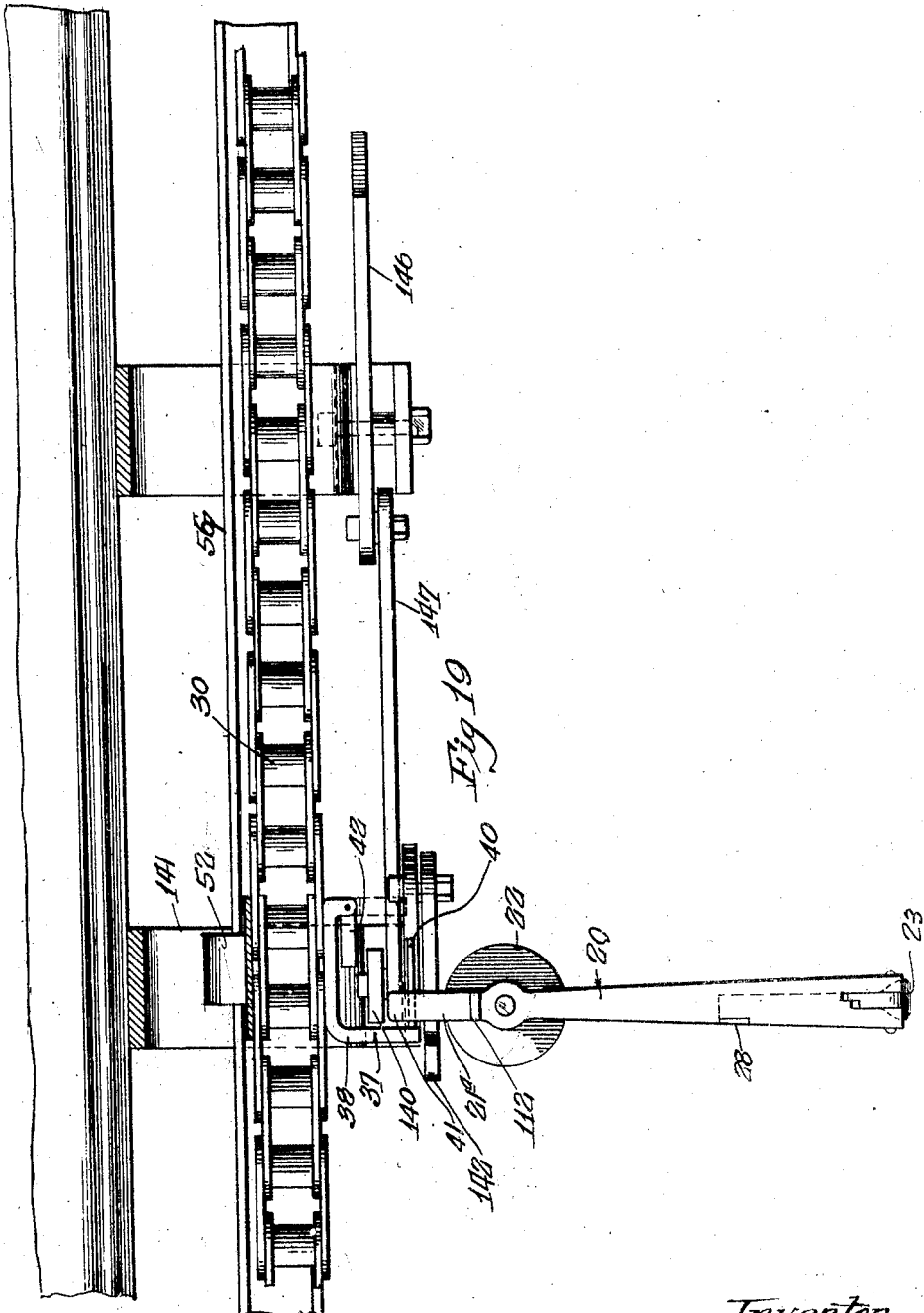

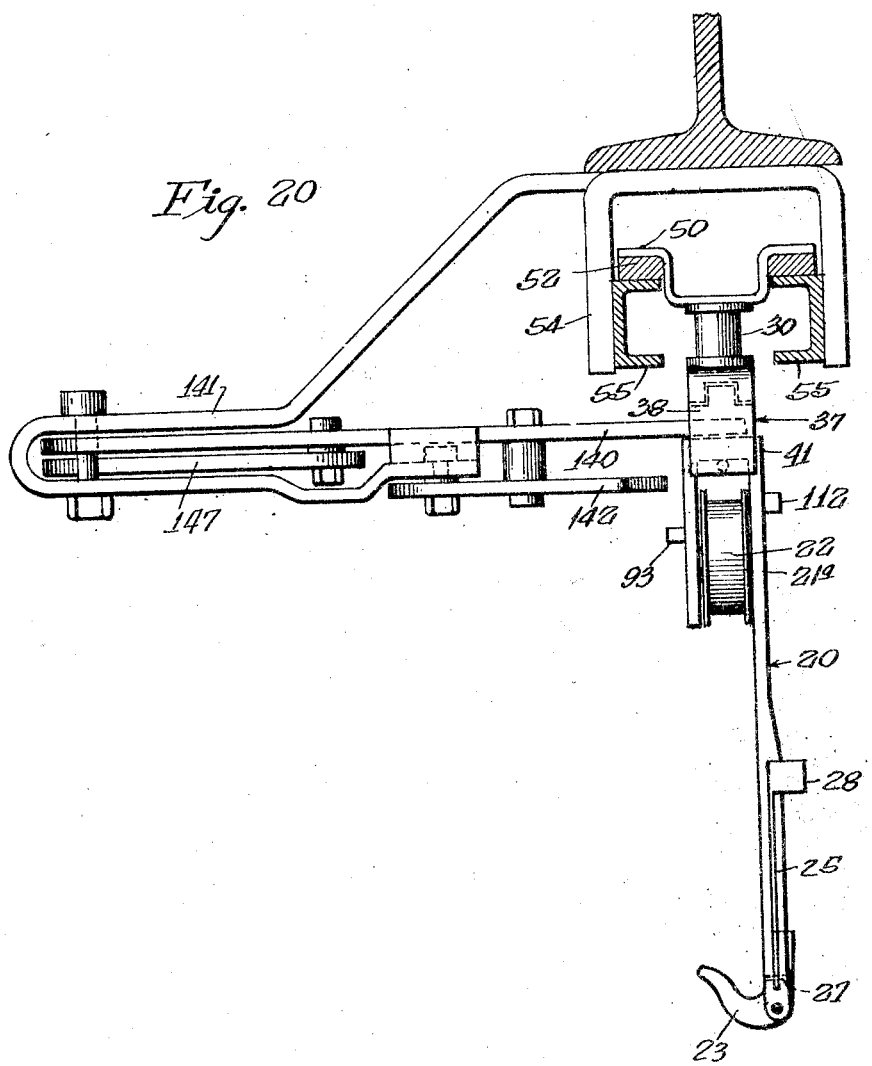

Sept. 22, 1925.  
A. H. SHAFFER  
CONVEYER SYSTEM  
Filed May 25, 1923 14 Sheets-Sheet 14  
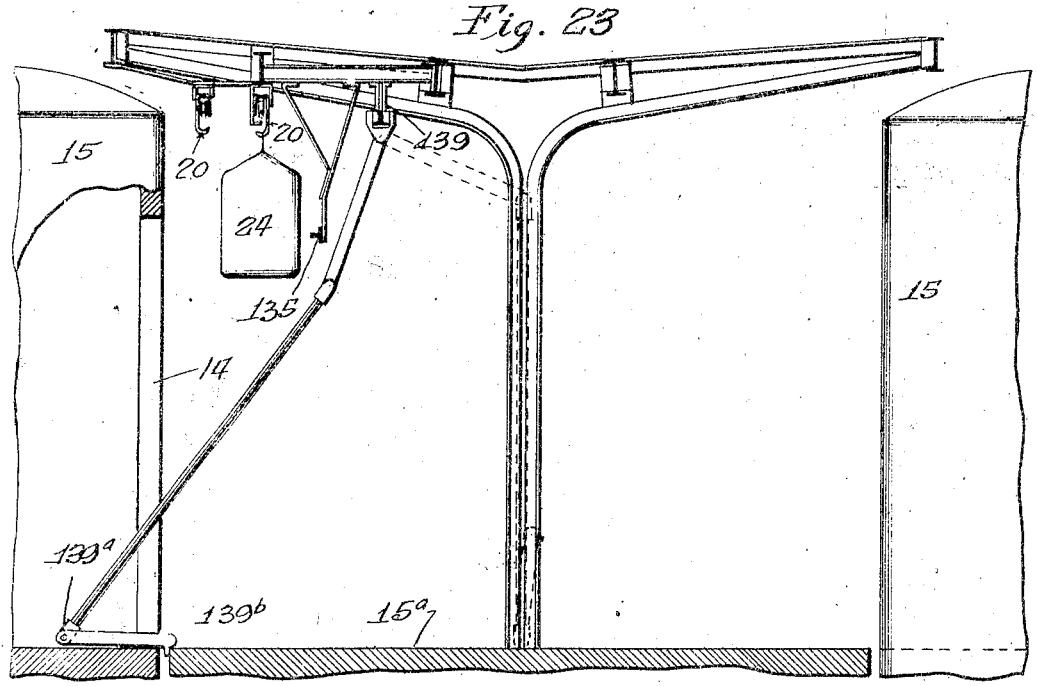
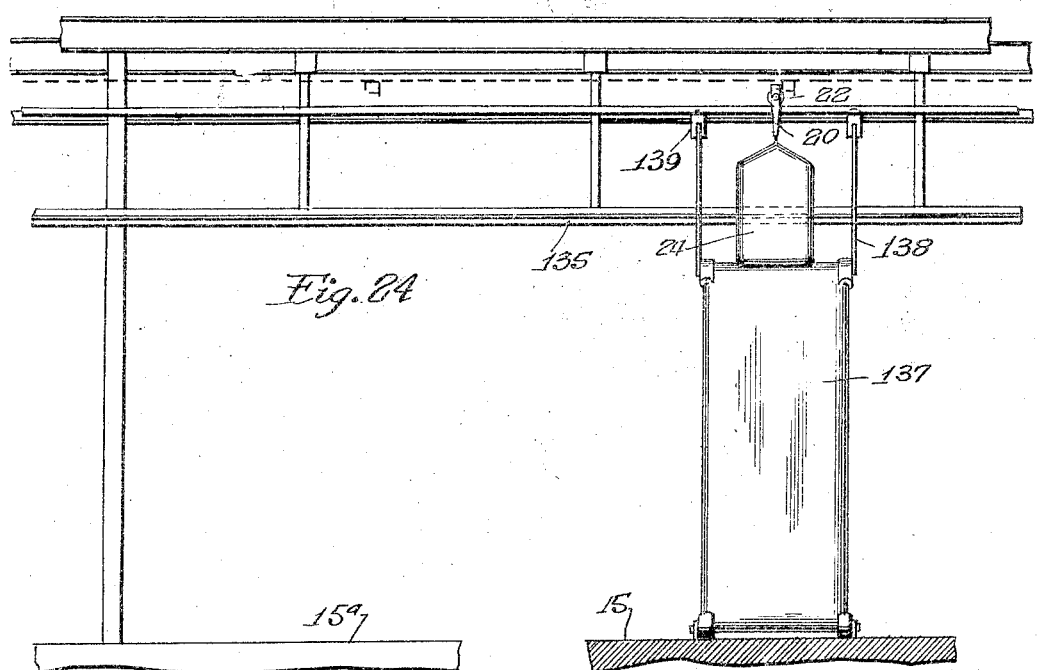

Patented Sept. 22, 1925.

1,554,765

UNITED STATES PATENT OFFICE.

ALFRED H. SHAFFER, OF RIVERSIDE, ILLINOIS, ASSIGNOR TO THE ALLBRIGHT-NELL COMPANY, OF CHICAGO, ILLINOIS, A CORPORATION OF ILLINOIS.

CONVEYER SYSTEM.

Application filed May 25, 1923. Serial No. 641,314.

*To all whom it may concern:*

Be it known that I, ALFRED H. SHAFFER, a citizen of the United States, residing at Riverside, in the county of Cook and State of Illinois, have invented new and useful Improvements in Conveyer Systems, of which the following is a specification.

This invention relates to improvements in conveyer systems and more particularly to conveyer systems adapted to selectively distribute packages or the like to various destinations in the system.

Among the objects of the present invention is to provide a plurality of carrying trolleys each having selective means for automatically finding a predetermined destination in the system and for releasing its load at that destination, and further to provide means for controlling the relative positions of the trolleys as they move along the various lines of the system, and further to provide an improved construction of track switches, and further to provide an improved construction of the load releasing devices at various points in the system, and further to provide means for automatically returning the carrying trolleys to the distribution station after the trolleys have reached the end of their outgoing journey, and further to provide an improved construction of delivery chute adapted to be placed at the various destination points in the system. Other objects of the invention will appear from time to time as the following description proceeds.

For the purpose of illustration, my invention is herein shown as applied to a conveyer system for selectively distributing mail sacks to outgoing mail cars in a railway station, altho various features thereof may be utilized in other distributing systems. In the present embodiment of my invention, the system includes a monorail trolley system having a main line connected to a central distribution station, several branch lines extending along tracks upon which mail cars are "spotted," and a plurality of sack-carrying trolleys, each trolley having selective means whereby it is automatically transported to a predetermined destination in the trolley system and there automatically releases the sack so as to deposit the latter at or in the particular car for which it is intended. Details of construction and operation of this embodiment of my invention may best be understood from the drawings, in which, Figure 1 is a diagrammatic plan view of my conveyer system as applied to a railway mail station.

Figure 2 is a diagrammatic view taken transversely of Figure 1, showing the main line of the conveyer system in elevation with portions thereof broken away.

Figure 3 is a diagrammatic view showing one branch line of the system in elevation and one device for automatically returning the trolleys to the distribution station by means of gravity.

Figure 4 is a diagrammatic view showing another branch line of the system in elevation having another device for automatically returning the trolleys to the distribution station by means of a belt conveyer.

Figure 5 is an enlarged detail view of a trolley.

Fig. 5ª is a detail view of the trolley latch mechanism.

Figure 6 is an enlarged detail view of a portion of the track adjacent the distribution station with parts broken away to show the device for automatically spacing the trolleys as they are picked up by the conveyer chain.

Figure 7 is a plan view of the track portion shown in Figure 6.

Figure 8 is a plan view showing details of a track switch, with parts omitted.

Figure 9 is a detail view of the switch locking mechanism drawn to a somewhat larger scale than Figure 8, with parts in section.

Figure 10 is a view similar to Figure 9 but showing the parts in a second position.

Figure 11 is a longitudinal cross section of Figure 8.

Figure 12 is a plan view of an electrical contacting device for opening and closing the switch, with parts omitted.

Figure 13 is a section of an electrical switch contacting device mounted on the branch line for closing the switch.

Figure 14 is a detail view of a trolley engaging member on a branch conveyer.

Figure 15 is a detailed plan view of a portion of a branch track with portions removed to show a load-releasing device with a trolley in position.

Figure 16 is a section taken on line 16—16 of Figure 14, showing the releasing device inoperative.

Figure 17 is a view similar to Figure 16, but with the releasing device operative.

Figure 18 is a detailed plan view of a knock-off device.

Figure 19 is a side view of the knock-off device.

Figure 20 is a sectional view taken on line 20—20 of Figure 18.

Figure 21:
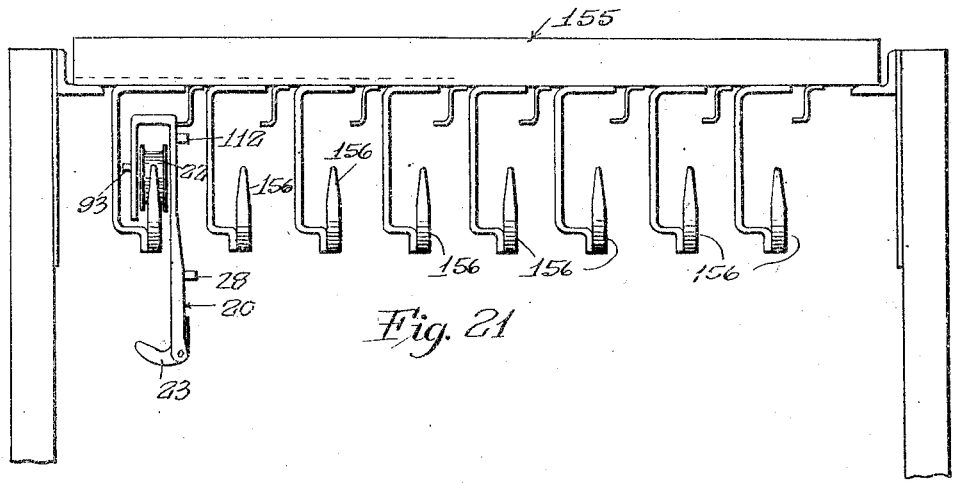
Figure 22:
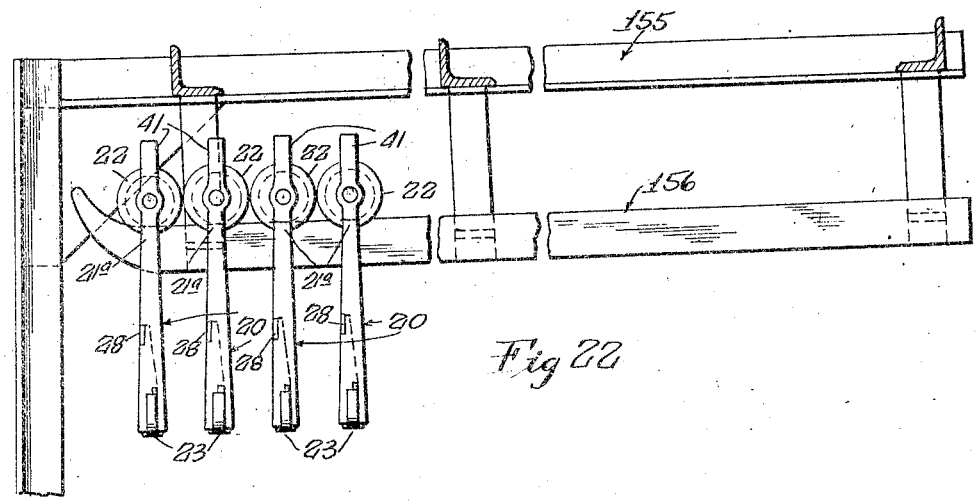

Figures 21 and 22 are detailed views of a trolley sorting rack.

Figure 23 is a transverse sectional view of a train shed, with distributing system installed and showing a movable delivery chute for delivering mail sacks into mail car door.

Figure 24 is a side view of the train shed shown in Figure 23.

Figure 1:
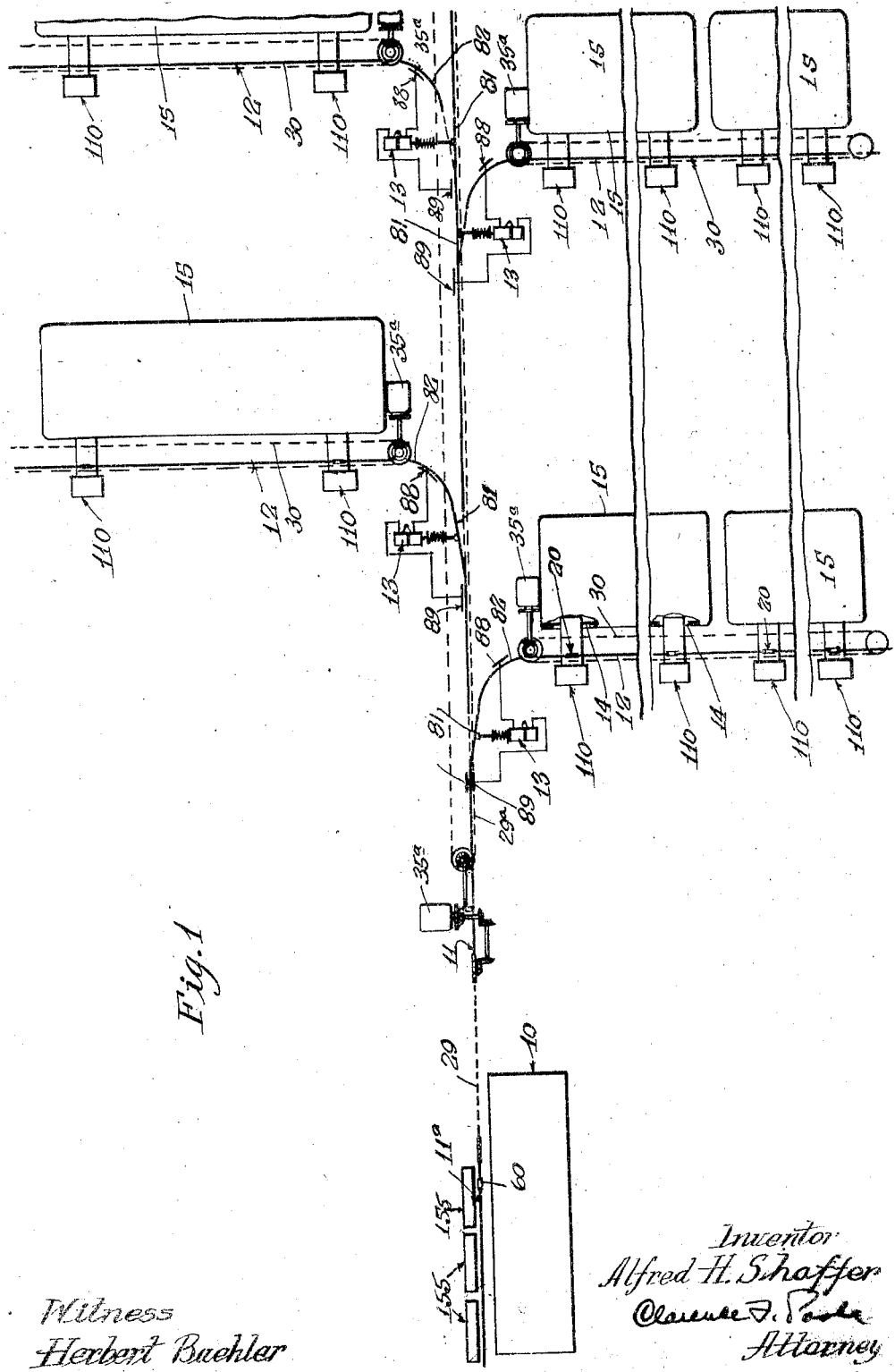

In Figures 1 and 2 of the drawings, a typical layout of a track system is shown diagrammatically. The mail sacks are sorted and loaded at a distributing station, herein shown as a loading platform 10, adjacent one end of a conveyer track section 11. The conveyer track is of the monorail type, as hereinafter more fully described, although other forms of track may be provided if desired. A plurality of branch tracks 12, 12 connect with the track 11 at suitable intervals by means of switches 13, 13. In the system shown, the track 11 forms a main line, and the tracks 12, 12 form branch lines extending along the railway track platforms 15ª, 15ª, and having thereon various distribution points, as for example, at doors 14, 14 of mail cars 15, 15 placed at certain points in the railway station. The conveyer carriages comprise a plurality of wheeled devices movable along the conveyer tracks, as for instance, a plurality of trolleys 20, 20. These trolleys each comprise a hanger 21, formed of a single inverted U-shaped piece 21ª and provided with a single flanged wheel 22. A hook member 23 depends from one side of the hanger, and is adapted to engage and support the load, which in the present instance is a mail sack 24. Means are provided for releasing the load which consists in pivotally mounting the hook member 23 on the hanger 21. Said hook member is normally held in position to engage the load by a locking arm 25, pivotally mounted at 27 to move on an axis transverse to the pivoted hook 23, and provided at its lower end with a detent 26 adapted to engage said hook. A projection 28 on the upper end of locking arm 25 is adapted to coact with suitable tripping or actuating devices 110, 110 placed at the various distribution points in the system, as will hereinafter be more fully described. When the detent 26 is disengaged, the hook 23 is free to swing downwardly and release its load by gravity.

Means are provided for propelling the trolleys together with their load along the various tracks of the system. In the form shown, the propelling means comprises a plurality of endless conveyers 29, 29ª—30 having portions thereof mounted to move along the various tracks, and provided with projecting members adapted to engage the trolleys. The conveyers shown are of the chain type, but any flexible conveyer device may be used for the purpose. The conveyers 29 and 29ª, along the main line 11 comprise a series of ordinary links 31, 31. Other links 32, 32 provided with means for engaging the trolleys, are spaced at equal intervals along the chain. The conveyers are trained over suitable driving sprockets 35, 35 and idler sprockets 36, 36, mounted in any suitable manner, and driven by power, as for instance by motors 35ª, 35ª. In Figure 2 it will be seen that conveyer 29 extends along an inclined portion 33 of the main track 11, and is conveniently trained over sprockets rotatable on longitudinal axes. Another conveyer 29ª extends along a substantially level portion 34 of said main track 11 and is trained over sprockets rotatable on vertical axes.

The trolley engaging members on the main line conveyers 29 and 29ª comprise pushing fingers 32ª, 32ª, projecting downwardly from links 32, 32 of the chain, and provided with rollers 32ᵇ, 32ᵇ extending into position to engage the rear surfaces of the trolley wheels 22, 22, and fitting between the flanges 22ª 22ª thereof just above the axes of said wheels. These engaging members are arranged to permit the trolleys to pass freely off the main line 11 when one of the switches 13 is opened for passage to a branch line 12.

The conveyers 30, 30 for moving the trolleys along the branch tracks 12, 12 may be arranged and driven in the same manner as the conveyers on the main line 11. The branch conveyers, however, are provided with a different type of engaging members 37, 37. These members are each adapted to automatically form a positive connection with the trolleys, and for this purpose comprise a downwardly extending finger 38, attached to a link 39 of the chain, and provided at its lower end with a forwardly extending pin 40 adapted to engage beneath the upper cross bar 41 on the trolley hanger. A hinged locking member 42 is connected at the forward end of the member 37, and arranged to be swung rearwardly by contact with the cross bar 41, so as to permit the latter to pass over the pin 40 when the finger 38 is moved toward the trolley, as indicated in Figure 14, in which position the trolley is retained on the pin 40. By means of this construction the trolley is automatically connected to one of the links 39 on a branch line conveyer 30 as soon as the trolley is switched onto a branch line 12 and is picked up by one of the trolley engaging members 37.

The portions of the conveyers intermediate their associated sprockets are movably supported by suitable means adjacent the tracks, as for example, the spaced chain links 32, 32 of the conveyers 29 and 29ª, as well as certain other links of the chain, are provided with arms 50, 50 extending laterally from the top of said links and movably supported on a pair of rails 51, 51, which in the form shown comprise oppositely disposed channel bars. These channel bars are arranged on opposite sides of the trolley rails 11, and the lower flanges 51ª, 51ª thereof extend inwardly into position to form lateral bearings for the trolleys. Suitable bearing means for the arms 50, 50 are provided, for example, fibre blocks 52, 52 are secured to the under faces of these arms so as to provide a practically noiseless antifriction bearing for the chain. The rails 51, 51 and trolley track 11 are all supported on hangers 53, 53 at suitable intervals. The return or inwardly moving flights of the conveyer are not associated with a trolley track, but may also be supported if desired on rail sections 55, 55 connected to hangers 54, 54 as shown in Figure 20. The conveyers 30, 30 are supported adjacent the branch tracks 12, 12 in a similar manner.

It is desirable to provide means for insuring the proper spacing of the trolleys while moving along the main and branch lines. As before stated the main line conveyers 29 and 29ª have a plurality of spaced trolley engaging members 32ª, 32ª, and a device is provided on the system for permitting but one trolley at a time to be admitted on the line for engagement with said conveyer members. This device is preferably located at the starting end of the first conveyer 29, as indicated at 60 in Figures 1 and 2. Details of this device are shown in Figures 6 and 7.

The idler sprocket 36 at the lower end of the inclined conveyer 29 is keyed on a shaft 61 having bearing in a journal 62. This journal may be movable longitudinally on the supporting frame 63 and adjusted by threaded members 64, 64, to control the tension of the conveyer chain. A pinion 65 is keyed on the shaft 61, and is meshed with a gear 66 on stub shaft 67. A reciprocating link 68 is connected to gear 66 by an eccentric device, such as a cam 69 rotatable with said gear and having engagement with a pair of oppositely disposed friction rollers 70, 70 carried on the link 68. This link is pivotally connected with a lever arm 71 on a rocking shaft 72. Said shaft is supported on the beam 73 by suitable means, as for instance a clamp 74 and bolts 75, 75, so as to be longitudinally adjustable along said beam with the sprocket 36 and its associated parts. A pair of oppositely disposed arms 76, 76 are mounted on the rocking shaft 72, and are each pivotally connected with a downwardly extending rod 77, slidable in suitable guides 78, 78 on the clamp. A pair of spacing fingers 79, 79 are connected to the bottom ends of the rods 77, 77. It will be seen that these fingers will be given vertical reciprocable movement in opposite directions when the shaft 72 is rocked, and said fingers are each arranged with respect to the trolley rail 11, so as to engage the upper cross bar 41 of the trolley 20 on said rail in all positions of said fingers excepting their extreme uppermost positions. Said fingers are also spaced from each other so as to admit but a single trolley at a time between them, as indicated in dotted lines in Figure 6. By means of this arrangement, a plurality of trolleys 20, 20 may be loaded on the inclined loading track section 11ª adjacent the loading platform 10, and all trolleys will move by gravity until they engage the nearest finger 79 of the spacing device 60, where they will be stopped. As this finger is raised to its uppermost position, one trolley may pass under it, but will be stopped by the second finger, which is then at its lowermost position. The movement of said fingers is then reversed until the second finger is at its topmost position when the trolley is released and permitted to pass on down the inclined rail into position to be picked up by one of the pushing fingers 32ª on the conveyer 29. The cam and gearing connection is arranged to be driven in timed relation with the conveyer chain 29 so as to pass but one trolley for each pushing finger 32ª.

At portions of the system where the trolley is not propelled by a conveyer, it is desirable to provide an incline for the trolley to proceed by gravity along the track. For example, where the trolley passes from the main line 11 to a branch line 12, the trolley leaves the main line conveyer 29ª, and must pass over the switch 13 before it is picked up by a branch line conveyer 30. At this point the portions of track intermediate the adjacent conveyers 29ª and 30 are downwardly inclined, this portion including the switch track 81 and the adjoining curved track sections 82, 82 leading into the branch lines 12, 12 as shown in plan view in Figure 1 and in profile in Figures 3 and 4. These inclined track portions are preferably provided with sufficient slope to produce a minimum speed of a trolley equal to the rate of movement of the conveyers, for otherwise the desired spaced relation of succeeding trolleys set up by the spacing device 60 may be disturbed, with detrimental effect on the smooth and efficient operation of the system. Similar inclined portions may be interposed between succeeding conveyers on the same line, as for instance, the portion indicated at 83 between conveyers 29 and 29ª on main line 11.

Each of the trolleys is provided with means adapted to coact selectively with the various switches 13, 13, so as to be directed automatically to a predetermined branch line 12. The trolleys are further provided with means adapted to coact selectively with the various releasing devices preferably located on branch lines 12, 12.

The switches 13, 13 and the selective means on the trolleys for operating said switches will now be described. In the form shown the switches are electrically operated, and each includes a pair of oppositely acting solenoids 85 and 86 having an armature 87 operatively connected with the pivoted switch track section 81. The solenoids are electrically operated from a suitable source, and adapted to be energized through contacting devices 88 and 89, respectively. One contacting device 88, connected in circuit with solenoid 85 for opening the switch, is positioned adjacent the main line track 11, as indicated in Figure 1, in advance of its respective switch. This contacting device may be of any suitable form, as for instance, a longitudinal shoe 90 connected by a pair of parallel links 90ª, 90ᶜ to a frame 91. The shoe is normally held outwardly by a spring 92, but when moved inwardly it closes a circuit through contacts 90ᵇ, 90ᵇ, and the solenoid 85. The shoe 90 is arranged at a certain height so as to contact with a projection 93 on one side of the trolley hanger. It is manifest that selective operation of the various switches will be afforded by providing a certain position of the coacting trolley and switch contacting members different from the positions of similar members on all other switches in the system.

A second contacting device similar to that just described is placed on the branch line just beyond the switch point, as shown in Figure 1. This contactor is in circuit with solenoid 86 for closing the switch after the trolley has passed thereover, the arrangement being such that the main line 11 is normally closed excepting for temporary passage of a trolley to its predetermined branch line, after which the switch is returned to normal closed position for movement of succeeding trolleys along the main line 11.

The operative connection between the armature 87 and the switch track section 81 includes a quick acting locking device operable to maintain the switch track portion 81 in either of its two positions, and to throw said switch quickly from one position to the other. This device comprises a pair of locking discs 95 and 96, longitudinally movable on a pin 97. Said pin is connected to the armature core 87 by means of a piece 97ª, made of brass or similar non-magnetic material, which forms a continuation of said armature and is slidably mounted therewith in the solenoids as shown. An operating arm 98 is pivotally connected at one end to the switch track portion 81, and has at its opposite end a yoke 99 extending over the outer locking disc 96. The locking discs 95 and 96 are provided with spindles 95ª and 96ª respectively which are telescopically engaged respective to each other, and when connected as shown, extend through an aperture formed in a downwardly extending piece 99ª integral with yoke 99. A compression spring 95ᵇ is inserted on the spindles intermediate disc 95 and yoke piece 99ª, and another spring 96ᵇ is similarly inserted between disc 96 and said yoke piece. Two spring pressed locking pawls 95ᶜ and 96ᶜ are pivotally mounted adjacent the respective discs 95 and 96, and arranged with their movable ends in position to engage opposite sides of one or the other of said locking discs. In Figures 8 and 9 the switch mechanism is shown with the switch leading to the branch track 12 in which position the outer disc 96 is engaged on its outer face by pawl 96ᶜ, and on its inner face by pawl 95ᶜ, and thus is securely locked against movement in either direction. The spring 96ᵇ is under compression, tending to maintain the yoke 99, connected through arm 98 to the switch track 81, firmly in closed position with said track in alignment with the branch track 12. To unlock the parts and throw the switch in the opposite direction the solenoid 86 is energized as for instance, by passage of the trolley over the contactor 88 on the branch line 12. The armature 87 will be moved by magnetic force in the direction to throw the switch. The initial movement of the armature serves to partially compress the spring 95ᵇ. A lock releasing member 96ᵈ is mounted beyond disc 96 on the pin 97, which has been described as being connected to the armature 87, and extending through the discs 95 and 96. This lock releasing member is moved with said pin and armature until it engages a cam 96ᵉ on the locking pawl 96ᶜ, and raises the latter, thereby releasing the locking disc 96 for free movement by the armature, and the spring 95$^b$ being then compressed as described, produces a quick movement of yoke 99' and connecting arm 98 into position shown in Figure 10, in which the switch track portion 81 is in alignment with the main line track 11. This movement causes the locking pawls 95$^c$ and 96$^c$ to engage the second locking disc 95, the inertia of this movement being sufficient to partially compress spring 95$^b$ before the parts become locked. Reverse operation of the switch to the first described position is produced in a similar manner, the pawl 95$^c$ being unlocked in this instance by a lock releasing member 95$^d$ on pin 97, adjacent disc 95.

The means for selectively actuating the release mechanism on the trolleys will now be described. A plurality of sack releasing devices 110, 110 are positioned at designated points in the system, preferably on the branch lines 12, 12. Each device comprises an electrical contacting device 111 responsive to a predetermined arrangement of a projection 112 on one of the trolleys 20 and adapted when closed to energize a solenoid 113 provided with an armature 114 movable into the path of the projection 28 of locking arm 25 on the trolley. In the form shown the contacting device comprises a longitudinal shoe 115 connected by a pair of parallel links 116, 116 to a frame 117. The shoe is normally held outwardly by a spring 118. Selective operation of the shoe is provided by arranging the shoe at a certain height to coact with a projection 112 on the trolley hanger 21. When the shoe is thus engaged it is moved inwardly to close a circuit through a pair of contacts 119, 119$^a$ mounted on the frame 117 but insulated therefrom by suitable insulating sockets 120, 120. The contacts 119, 119$^a$ are preferably provided with springs 121, 121 coacting therewith to permit a limited longitudinal movement when engaged by the shoe 115. From one of the contacts 119 a conductor 122 leads to the solenoid 113, also mounted on the frame. A spring 123 is connected to the outer end of the armature 114 tending to maintain the latter in retracted position in the solenoid casing 124, as shown in Figure 16. Current is supplied to the circuit through conductors 125 and 126, connected to the solenoid and one of the contacts 119, respectively. The frame 117 on which the entire contacting device is mounted, is movably connected to a suitable rail 130 extending alongside the track rail 12 and supported on the track hangers 53, 53. This movable connection of the frame comprises a clamping cam member 131, pivoted on the frame and operable by a handle 132 to engage the outer side of rail 130 above a flange 130$^a$ thereon. The cam member 131 may be partially released, as shown in full lines in Figure 15, in which position the contacting device 110 is supported for movement bodily along the rail flange 130$^a$, thus affording various adjustments along the branch line 12, depending upon the relative position of the mail car door to which it is desired to deliver the load. The electrical conductors 125 and 126 are in the form of a flexible cable 133 to permit such adjustment. The clamping member 131 may also be moved further into position to fully detach the contacting device from the rail 130 as shown in dotted lines in Figure 15. The various contacting devices are therefore interchangeable to various parts of the system, and for this purpose the flexible supply cable 133 is provided with a detachable plug 134 of the usual type, connectible to various sockets 135 disposed at intervals along a conduit 136 extending adjacent the track.

It will be understood that the projections 93 and 112 which cooperate respectively with the switches 13 and load releasing devices 110 may be arranged in various positions on the hanger 21 to produce a wide range of selective combinations for the trolleys. Furthermore, it is obvious that these projections, as well as the coacting members 90 and 115 on the switches and releasing devices respectively, may be adjustable, if desired, but for the purposes of illustrating the present invention it is sufficient to show these members as being fixed to their associated parts.

It is desirable in an apparatus of the present character for handling dependent loads such as mail sacks to provide means for eliminating excessive swaying of the load as it moves along the tracks. To this end I provide a rail 135 supported on suitable brackets and extending below and spaced laterally from the branch track 12, as clearly shown in Figures 23 and 24. A small amount of clearance is preferably provided between the rail and the load, when the latter is depending normally from the track, but said rail is arranged near enough to said load to check any excessive lateral swinging of the latter. I also provide a novel form of chute by which the mail sacks may be loaded directly into the cars 15, 15. This device comprises a chute 137 having an arm 138 slidably connected to a rail 139 extending along the train platform outside of the conveyer track 12. The lower end of the chute is free to be swung into and out of the car door as shown in Figure 23. A pivoted brace 139$^a$ is connected to the lower end of the chute and provided with a projection 139$^b$ at its outer end, adapted when in position to engage the edge of the train platform so as to hold the chute in the desired position shown in Figure 23. When not in use the brace 139$^a$ may be folded upwardly and the entire chute may be swung laterally away from the car so as not to interfere with the passage of passengers or station vehicles along the edge of the platform.

The knock-off device will now be described. This device is designed to automatically disconnect the trolleys from the branch line conveyers 30, 30, after the load has been released from said trolleys and the latter have been carried, empty, beyond the end of the branch track and returned along the incoming flight of said conveyer to a point convenient to return said trolley to the distribution point for another outgoing journey. This knock-off device is therefore preferably located adjacent the main line track 11, in position to drop the trolleys on an independent conveyer of minimum length for return to the sorting and distribution station, although under some conditions it may be more advantageously located at other points along the return flight of conveyer 30. As before described, the trolleys are adapted to be connected to the conveyer by means of a forwardly extending pin 40 of a trolley engaging member 37, with a hinged member 42 closing the front end of said pin. The knock-off device for separating the trolleys from this connection is shown in detail in Figures 18, 19 and 20 and comprises lever 140 pivotally mounted on a suitable bracket 141 connected to the return flight supporting rails 55, 55. A pusher lever 142, shorter than the first lever is pivotally mounted on a projecting bracket 143 and off set in the direction of movement of the conveyer chain. The pusher lever 142 is slideably connected to the lever 140 by a pin 144 on the latter working in a slot 145 in the former. The lever 140 is arranged to extend into the path of movement of the trolley engaging members 37, 37, as they carry the trolleys along. Said lever first engages the pivoted piece 42 at the forward end of the connecting members 37, so as to swing the latter upwardly, as shown in Figure 19. This lever is then moved pivotally by the connecting member 37, and the shorter lever 142 is caused to be forwardly moved at a greater rate than the longer lever, owing to their cooperative arrangement as shown. The outer end of the shorter lever 142 thus engages the rear of the trolley, and moves it forwardly of the pin 40. The trolley is thus knocked off the conveyer, and may drop by gravity to a conveyer for return to the distributing point, or loading platform. The levers 140 and 142 are returned to operative position by suitable means such as a lever 146, located beyond said first named lever, and pivotally mounted intermediate its ends on a bracket 147a. A link 147 is pivotally connected between the outer end of lever 146 and an intermediate point 148 of lever 140. The arrangement is such that the outer end 140a of lever 146 is moved into the path of a trolley engaging member 37 by the same movement which disconnects a trolley from said engaging member. Said last named lever is then engaged and moved by the member 37, which movement is transmitted through link 147 to return the levers 140 and 142 to their operative positions, as shown in full lines in Figure 18.

Any form of conveying device, independent of the main conveying system, may be used for returning the trolleys to the distribution point, as for instance, a gravity conveyer 150 may be used advantageously, as shown in Figure 3, when the knock-off is relatively near the distribution station, or a belt conveyer 151 such as shown in Figure 4, may be preferable where the knock-off device is at a considerable distance from the distributing station.

When the trolleys are returned to the distributing station, they may be sorted and arranged for further use. For this purpose it is desirable to provide sorting racks 155, 155 as shown in Figures 21 and 22, adjacent the loading rail, for convenience in picking out a trolley provided with the desired combination for carrying the sack to its proper destination. This rack comprises a series of parallel rail portions 156, 156, on which the trolleys may be arranged according to their respective destinations. The use and operation of the distributing system will be sufficiently understood by those skilled in the art from the above description.

Although I have shown and described one form in which my invention may be embodied, it will be understood that the specific construction of the various parts and devices of the system may vary widely from those herein shown and described without departing from the scope of my invention. For instance, electrical devices have been shown as a preferred form of switch and load releasing means, but so far as the broader features of the invention are concerned, mechanically actuated devices might be utilized, if desired. I do not therefore wish to be understood as limiting myself to the specific details of mechanisms shown and described, excepting in so far as specifically defined in the appended claims.

I claim as my invention:

1. In a conveyer system, in combination with a trolley, a length of track for supporting said trolley, means movable along said track connectible with said trolley for propelling the same, said means extending beyond said track and adapted to carry said trolley independent of said track during a portion of its movement.

2. In a conveyer system, in combination with a trolley, a length of track for supporting said trolley, means movable along said track automatically connectible with said trolley for propelling the same, said means extending beyond said track and adapted to carry said trolley independent of said track, and means for automatically disconnecting said trolley and propelling means at a predetermined point in the system.

3. In a conveyer system, in combination with a trolley, load releasing means on said trolley, a length of track for supporting said trolley, means along said track cooperating with said load releasing means, means movable along said track connectible with said trolley for propelling the same, said means extending beyond said track and adapted to carry said trolley independent of said track during a portion of its movement.

4. In a conveyer system, a main track, a plurality of branch tracks, diverging and having switching means therefor, a plurality of trolleys movable on said tracks having selective means for operating said switches, endless conveyers for propelling said trolleys, having one portion extending along each of said branch tracks and movable away from said main line track, and another portion removed from said tracks, said conveyers having means connectible with said trolleys to carry them independent of said track in a general direction reversed from its out-going movement along said track.

5. In a conveyer system, in combination with a trolley, a length of track for supporting said trolley, an endless conveyer provided with a plurality of projecting trolley engaging devices and having a portion thereof movable along said track, and means on said engaging devices connectible with said trolley whereby the latter is moved beyond the length of track in supporting engagement with said conveyer and carried thereby in a direction reversed from its movement along the track.

6. In a conveyer system, in combination with a trolley, a length of track for supporting said trolley, an endless conveyer provided with a plurality of projecting trolley engaging devices and having a portion thereof movable along said track, means on said engaging devices automatically connectible with said trolley whereby the latter is moved beyond the length of track in supporting engagement with said conveyer, and means for automatically disengaging said trolley from said engaging devices at a predetermined point in said system.

7. In a conveyer system, in combination with a trolley, a length of track for supporting said trolley, a load releasing device on said trolley, means adjacent said track adapted to operate said load releasing device, an endless conveyer provided with a plurality of trolley engaging devices and having a portion thereof movable along said track, and means associated with said engaging devices adapted to automatically connect with said trolley whereby the latter is moved beyond the length of track in supporting engagement with said conveyer and carried thereby in a direction reversed from its movement along said track.

8. In a conveyer system, in combination with a plurality of trolleys, a length of track for supporting said trolley, load releasing devices on each of said trolleys, a plurality of means spaced apart on said track each adapted to coact selectively with said load releasing devices, an endless conveyer provided with a plurality of trolley engaging devices and having a portion thereof movable along said track, and means on said engaging devices adapted to automatically connect with said trolley whereby the latter is moved beyond the length of track in supporting engagement with said conveyer and carried thereby in a direction reversed from its movement along said track.

9. In a conveyer system in combination with a trolley provided with load releasing means, a main line track, a branch line track having suitable switching devices therefor, an endless conveyer along said main line track provided with a plurality of spaced trolley engaging members, and another conveyer along said branch line track provided with a plurality of spaced trolley engaging members, said last named members having means for connecting with said trolley and supporting the latter independent of the track during a portion of its movement.

10. In a conveyer system in combination with trolleys provided with load releasing means, a main line track, a branch line track having suitable switching devices therefor, means on said track cooperating selectively with said load-releasing means, an endless conveyer along said branch line track provided with a plurality of spaced trolley engaging members, another conveyer along said branch line track provided with a plurality of spaced trolley engaging members, said last named members having means for connecting with said trolley carrying device and supporting the latter independent of the track during a portion of its movement, and means for automatically disconnecting the trolley from said last named members.

11. In a conveyer system in combination with a trolley, load releasing means on said trolley, a main line track, a branch line track having suitable switching devices therefor, an endless conveyer along said main line track provided with a plurality of spaced trolley engaging members, said last named members having means for connecting with said trolley carrying device and supporting the latter independent of the track during a portion of its movements, means for automatically disconnecting the trolley from said last named members at a predetermined point, and means independent of said conveyers and track system for moving said trolleys from its point of disconnection to another point in the system.

12. In a conveyer system in combination with a plurality of trolleys, load releasing means on said devices, a main line track, a branch line track having suitable switching devices therefor, means on said trolleys for actuating said switches selectively, other means on said trolleys for selectively actuating the load releasing means at various points on said branch line, an endless conveyer along said main line track provided with a plurality of spaced trolley engaging members, and another conveyer along said branch line track provided with a plurality of spaced trolley engaging members, said last named members having means for connecting with said trolleys and supporting the latter independent of the track during a portion of their movement.

13. In a conveyer system, in combination with a trolley, a length of track for supporting said trolley, an endless conveyer movable along said track provided with a connecting device for said trolley, comprising a forwardly opening hook adapted to support said trolley independent of said track during a portion of its movement.

14. In a conveyer system, in combination with a trolley, a length of track for supporting said trolley, an endless conveyer movable along said track provided with a connecting device for said trolley, comprising a forwardly opening hook adapted to support said trolley independent of said track during a portion of its movement, and means for disengaging said hook and trolley.

15. In a conveyer system, in combination with a trolley, a length of track for supporting said trolley, an endless conveyer movable along said track provided with a connecting device for said trolley, comprising a forwardly opening hook adapted to support said trolley independent of said track during a portion of its movement, and means for disengaging said hook and trolley comprising an arm operable by said conveyer to move said trolley forwardly at a greater speed than said conveyer.

16. In a conveyer system, in combination with a trolley, a length of track for supporting said trolley, an endless conveyer movable along said track provided with a connecting device for said trolley, comprising a forwardly opening hook adapted to support said trolley independent of said track during a portion of its movement, and locking means movable automatically into position to close said hook.

17. In a conveyer system, in combination with a trolley, a length of track for supporting said trolley, an endless conveyer movable along said track provided with a connecting device for said trolley, comprising a forwardly opening hook adapted to support said trolley independent of said track during a portion of its movement, and a hinged depending finger movable by gravity into position to close said hook.

18. In a conveyer system, in combination with a trolley, a length of track for supporting said trolley, an endless conveyer movable along said track provided with a connecting device for said trolley, comprising a forwardly opening hook adapted to support said trolley independent of said track during a portion of its movement, locking means movable automatically into position to close said hook, means for disengaging said hook and trolley comprising means moving said locking means out of closing position, and a cooperating arm actuated by said conveyer to move said trolley forwardly at a greater speed than the movement of said conveyer.

19. In a conveyer system, in combination with a trolley, a length of track for supporting said trolley, an endless conveyer movable along said track provided with a connecting device for said trolley, comprising a forwardly opening hook adapted to support said trolley independent of said track during a portion of its movement, a hinged depending finger movable by gravity into position to close said hook, and means for disengaging said hook and trolley, comprising a lever coacting with said hinged finger to raise the same out of closing position, and a cooperating arm actuated by said conveyer to move said trolley forwardly at a greater speed than the movement of said conveyer.

20. In a conveyer system, in combination with a trolley, a main track, propelling means detachably engaging said trolley for movement along said main track, a branch track, a switch track connecting said track and branch track, other propelling means beyond said switch for detachably engaging said trolley for movement along said branch track, said switch track being inclined away from said main line track whereby the trolley will be acted upon by gravity while passing from the first named propelling means into engagement with the second named propelling means.

21. In a conveyer system, in combination with a trolley, a main track, propelling means detachably engaging said trolley for movement along said main track, a branch track, a switch track connecting said track and branch track, other propelling means beyond said switch for detachably engaging said trolley for movement along said branch track, said switch track and the track portions of the main and branch tracks intermediate the two propelling means being inclined away from said main line track whereby the trolley will be acted upon by gravity while passing from the first named propelling means into engagement with the second named propelling means.

22. In a conveyer system, in combination with a plurality of trolley engaging devices, a main track, propelling means having a plurality of members detachably engaging said trolleys for movement along said main track, a branch track, other propelling means for moving said trolleys along said branch track, and a track portion including a switch intermediate the two said propelling means on said main and branch tracks, said track portion being inclined from the former propelling means to the latter whereby the trolleys will be acted upon by gravity while passing between said means, and means on the main line automatically controlling the spacing of successive trolleys whereby but a single trolley is permitted to move at one time along said inclined portion intermediate said main line and branch line propelling means when the switch is open.

23. In a conveyer system, a plurality of tracks and connecting switches, a plurality of trolleys provided with load releasing devices, means on said trolleys selectively cooperating with said switches, tripping members at predetermined points in the system movable into and out of cooperative engagement with said load releasing devices, tension means normally retaining said members in retracted position, and power devices selectively actuated by means on said trolleys for overcoming said tension means.

24. In a conveyer system, a plurality of tracks and connecting switches, a plurality of trolleys provided with load releasing devices, means on said trolleys selectively cooperating with said switches, electro-magnetic means interchangeable to various points in said system, and movable into and out of cooperative position with said load releasing devices, means on said trolleys for selectively actuating said movable means, and current conductors extending along said tracks and having taps at intervals therealong detachably connectible with said electro-magnetic means for supplying current thereof.

25. In a conveyer system, a plurality of tracks and connecting switches, a plurality of trolleys provided with load releasing devices, means on said trolleys selectively cooperating with said switches, electro-magnetic means interchangeable to various points in said system, and movable into and out of cooperative position with said load releasing devices, means on said trolleys for selectively actuating said movable means, current conductors extending along said tracks and having taps at intervals therealong, and flexible current conductors for said electromagnetic means detachably connectible with said taps.

26. In a conveying system, a track, a plurality of carriages, a conveyer device having a plurality of spaced engaging members for propelling said carriages on said track, and means controlled in timed relation with said conveyer device for releasing said carriages singly for engagement by successive engaging members on said conveyer device.

27. In a conveying system, a loading track, a plurality of carriages, a conveyer device having a plurality of spaced engaging members for propelling said carriages on said track, and spacing means adjacent said loading track controlled in timed relation with said conveyer device for releasing said carriages singly for engagement by successive engaging members on said conveyer device.

28. In a conveying apparatus, a track system, a plurality of carriages, a conveyer device having a plurality of spaced engaging members for propelling said carriages on said track system, an inclined loading track communicating with said track system, and spacing means on said loading track including a pair of stop members reciprocable vertically in opposite directions and spaced longitudinally from each other to accommodate but a single carriage at one time.

29. In a conveying apparatus, a track system, a plurality of carriages, a conveyer device having a plurality of spaced engaging members for propelling said carriages on said track system, an inclined loading track communicating with said track system, and spacing means on said loading track including a pair of stop members reciprocable vertically in opposite directions and spaced longitudinally from each other to accommodate but a single carriage at one time, said stop members being operable in a predetermined timed relation with said conveyer device.

30. In a conveying apparatus, a track system, a plurality of carriages, a conveyer device having a plurality of spaced engaging members for propelling said carriages on said track system, an inclined loading track communicating with said track system, spacing means on said loading track comprising a pair of stop members reciprocable vertically in opposite directions and spaced longitudinally from each other to accommodate but a single carriage at one time, a device rotatably engaged by said conveyer, and means operably connecting said rotatable device with said stop members, including a rocking shaft, an eccentric device, and a connecting link.

31. In a conveyer system, a trolley provided with a wheel, a track, and a movable conveyer device provided with means for propelling said trolley, including a roller bearing member movably mounted in position to engage said trolley wheel just above the axis thereof.

32. In a monorail track conveyer system, a trolley having a wheel provided with double flanges, and a movable conveyer device provided with means for propelling said trolley including a roller member movably mounted in position to have bearing on said trolley wheel between said flanges.

33. In a monorail track conveyer system, a trolley having a wheel provided with double flanges, and a movable conveyer device provided with means for propelling said trolley including a roller member movably mounted in position to have bearing on said trolley wheel between said flanges and above the axis of said wheel.

34. In a monorail track conveyer system, a trolley having a wheel provided with double flanges, and a movable conveyer device provided with means for propelling said trolley including a roller member movably mounted in position to have lateral bearing in both directions with said trolley wheel.

35. In a monorail track conveyer system, a trolley having a wheel provided with double flanges, and a movable conveyer device provided with means for propelling said trolley including a roller member movably mounted in position to have peripheral and lateral bearing between said wheel flanges.

36. In combination with an overhead conveyer having carriages and means for depositing by gravity loads at various points, a chute having one end slideably supported adjacent said conveyer and movable into and out of angular position underneath said conveyer.

37. In combination with an overhead conveyer having carriages and means for depositing by gravity loads at various points, a chute having one end slideably supported adjacent said conveyer and movable into and out of angular position underneath said conveyer, and an arm pivotally connected adjacent the lower end of said chute having a stop thereon adapted to support said chute in a predetermined position respective to said conveyer.

38. In combination with an elevated conveyer adapted to carry dependent loads, a rail extending below and spaced laterally at one side of the normal path of movement of the said dependent loads to check excessive lateral swinging movements thereof.

39. In a conveyer system, in combination with a monorail track and a carriage movably supported thereon, a conveyer device having means engaging said carriage for propelling the same, and a plurality of spaced supporting members comprising laterally extending arms, and bearing means for said supporting members extending along said track.

40. In a conveyer system, in combination with a monorail track and a carriage movably supported thereon, a conveyer device having means engaging said carriage for propelling the same, and a plurality of spaced supporting members comprising laterally extending arms extending in opposite directions above said track, and a pair of spaced bearing rails for said supporting members extending along said track.

41. In a conveyer system, in combination with a monorail track and a carriage movably supported thereon, a conveyer device having means engaging said carriage for propelling the same, and a plurality of spaced supporting members comprising laterally extending arms extending in opposite directions above said track, and a pair of spaced bearing rails for said supporting members extending along said track, each having portions thereof extending downwardly on opposite sides of said carriage in position to form lateral guides for the latter.

Signed at Chicago, in the county of Cook and State of Illinois, this 19th day of May, 1923.

ALFRED H. SHAFFER.